(12) United States Patent
Lehmann

(10) Patent No.: US 10,427,066 B2
(45) Date of Patent: Oct. 1, 2019

(54) MULTI-STAGE DISTILLATION SYSTEM, METHOD FOR THE OPERATION THEREOF

(71) Applicant: THERMAL PURIFICATION TECHNOLOGIES LIMITED, Buchs (CH)

(72) Inventor: Markus Lehmann, Wohlen (CH)

(73) Assignee: Thermal Purification Technologies Limited, Buchs (CH)

( * ) Notice: Subject to any disclaimer, the term of this patent is extended or adjusted under 35 U.S.C. 154(b) by 92 days.

(21) Appl. No.: 15/550,622

(22) PCT Filed: Feb. 10, 2016

(86) PCT No.: PCT/EP2016/052811
§ 371 (c)(1),
(2) Date: Aug. 11, 2017

(87) PCT Pub. No.: WO2016/128455
PCT Pub. Date: Aug. 18, 2016

(65) Prior Publication Data
US 2018/0021691 A1    Jan. 25, 2018

(30) Foreign Application Priority Data

Feb. 13, 2015   (CH) ..................... 00198/15

(51) Int. Cl.
*B01D 1/26* (2006.01)
*B01D 1/00* (2006.01)
(Continued)

(52) U.S. Cl.
CPC ............. *B01D 1/26* (2013.01); *B01D 1/0082* (2013.01); *B01D 5/006* (2013.01); *B01D 5/0036* (2013.01);
(Continued)

(58) Field of Classification Search
CPC ........ B01D 1/0082; B01D 1/26; B01D 5/006; B01D 5/0036; B01D 5/0051; C02F 1/048;
(Continued)

(56) References Cited

U.S. PATENT DOCUMENTS 1,944,548 A * 1/1934 Ebner ..................... B01D 3/10
159/1.1
3,206,379 A * 9/1965 Hill ....................... B01D 1/0088
159/13.1
(Continued)

FOREIGN PATENT DOCUMENTS

GB              939188 A * 10/1963 ............... C02F 1/16
WO    WO 2008/122136      10/2008
WO    WO 2012/104662       9/2012

OTHER PUBLICATIONS

English translation of International Preliminary Search Report on Patentability, dated Aug. 15, 2017.
International Search Report, dated May 23, 2016.

Primary Examiner — Youngsul Jeong
Assistant Examiner — Gabriel E Gitman
(74) Attorney, Agent, or Firm — Dority & Manning, P.A.

(57) ABSTRACT

A multi-stage distillation system includes multiple stages, and each stage Si includes an evaporator Ei and a condenser Ci. Each condenser includes a steam chamber in pressure-connection with a steam chamber of each evaporator of the same stage. Each evaporator has a steam chamber outlet connected to a spray inlet of the next evaporator Ei+1, and the outlet of the last evaporator En connects to the spray inlet of the first evaporator E1 with a respective fluid line to form an evaporator circuit. Each outlet of each condenser Ci connects to the one spray inlet of the previous condenser Ci−1, and the outlet of the first condenser C1 connects to the spray inlet of the last condenser Cn with a fluid line to form
(Continued)

a condenser circuit. A steam line connects between condensers Ci+1 and Ci or between the evaporators En and E1.

18 Claims, 3 Drawing Sheets

(51) Int. Cl.
  *B01D 5/00* (2006.01)
  *C02F 1/04* (2006.01)
  *C02F 103/08* (2006.01)

(52) U.S. Cl.
  CPC ............ *B01D 5/0051* (2013.01); *C02F 1/048* (2013.01); *C02F 2103/08* (2013.01); *C02F 2201/009* (2013.01); *C02F 2209/42* (2013.01); *Y02A 20/128* (2018.01); *Y02A 20/212* (2018.01)

(58) Field of Classification Search
  CPC ............ C02F 2201/009; C02F 2209/42; C02F 2103/08; Y02A 20/128; Y02A 20/212
  See application file for complete search history.

(56) References Cited

U.S. PATENT DOCUMENTS

| | | | | |
|---|---|---|---|---|
| 3,249,517 A | * | 5/1966 | Lockman | B01D 3/065 159/18 |
| 3,583,895 A | * | 6/1971 | Othmer | B01D 1/26 159/16.1 |
| 3,627,646 A | * | 12/1971 | Osdor | B01D 3/065 202/93 |
| 3,856,631 A | * | 12/1974 | Smith, Jr. | B01D 1/26 159/DIG. 17 |
| 8,434,241 B2 | | 5/2013 | Lehmann et al. | |
| 8,617,359 B2 | | 12/2013 | Lehmann et al. | |
| 2010/0163398 A1 | | 7/2010 | Lehmann et al. | |

\* cited by examiner

MULTI-STAGE DISTILLATION SYSTEM, METHOD FOR THE OPERATION THEREOF

CROSS-REFERENCE TO RELATED APPLICATIONS

This application claims priority to International Application Serial No. PCT/CH2016/052811, filed Feb. 10, 2016, which claims priority to Swiss Application No. 00198/15, filed Feb. 13, 2015. International Application Serial No. PCT/CH2016/052811 is hereby incorporated herein in its entirety for all purposes by this reference.

FIELD OF THE INVENTION

The invention relates to a multistage distillation system, wherein each stage operates in a higher pressure and temperature range than its ensuing stage during operation, wherein each stage comprises an evaporator and condenser with one pressure-tight container each, with an upper spray inlet for introducing and spraying added liquid, as well as with a lower outlet for letting out captured liquid, as well as with a steam space between the spray inlet and the captured liquid, wherein the steam space of each evaporator is compressively bonded with the steam space of the condenser of the same stage by a pressure-tight steam pipe with a cross section large enough that the pressure in the two steam spaces of one stage can always balance itself out during operation. In addition, the invention relates to a method for implementing such a distillation system, along with a controller for its operation.

BACKGROUND

Distillation systems have long been known. For example, they serve to prepare water or separate alcohol from other liquids, and are used in numerous other systems. In principle, the liquid to be distilled is evaporated while exposed to heat, so as to separate it from the residues, for example from salts or other liquids with a higher boiling point. The vapor is finally cooled in another chamber, causing it to condense into the distillate.

FIG. 1 shows a multistage distillation system 1 according to prior art. Three stages are depicted, which are each denoted by lower parentheses marked S1, S2 and S3. Stage S1 is also bordered by a dashed line up to a part that is connected with stage S2 by a heat exchanger 14. Each stage S consists of an evaporator (or evaporator) E1, E2, E3, which comprises the respective left chamber of each stage S1, S2, S3, and a condenser (or condenser) C1, C2, C3, which comprises the respective chamber of the stage S shown on the right. The evaporators and condensers all have a steam space, wherein the steam spaces of the evaporators E1, E2, E3 and condensers C1, C2, C3 of the respective same stage S1, S2, S3 are interconnected by a respective connecting steam space 6, wherein the size of this connecting steam space 6 is dimensioned in such a way that the pressure P inside of the steam spaces of this stage can be balanced out unimpededly. As a consequence, the same pressure P1, P2, P3 prevails in both chambers of each stage S1, S2, S3. In each chamber, liquid 4 is upwardly conveyed out of the chamber to a spray inlet 3, and there sprayed. The sprayed liquids 4a in the evaporators E1, E2, E3 have a slightly higher temperature than the sprayed liquids 4a of the condensers C1, C2, C3 of the respective same stage. The temperatures of the evaporators E1, E2, E3 are correspondingly slightly higher, and the temperatures of the condensers C1, C2, C3 slightly lower, than the temperatures Ts1, Ts2, Ts3 of the saturation curve for the respective steam pressure P1, P2, P3 known for the respective liquid.

For this reason, the liquid 4a sprayed in each evaporator will partially evaporate and flow into the adjacent chamber of the accompanying condenser, where it collides with the cooler drops and itself condenses again. Over time, evaporated liquid thus wanders from each evaporator into the condenser of the same stage. The distillate can there be skimmed, while new liquid can be introduced into the evaporator.

As a consequence, the first stage S1 operates with a temperature T1,1 in the evaporator E1, or with the temperature T1,2 in the condenser C1, in that the liquids 4a are sprayed into the chambers with the indicated temperatures. The adjacent chamber of the condenser C1 is the evaporator E2, which forms the second stage S2 together with the condenser C2. Accordingly, these chambers of stage S2 operate with temperatures T2,1 in the evaporator E2 and T2,2 in the condenser C2, wherein the adjoining chambers C1 and E2 are set to the same temperature. Therefore, the following applies: T1,2=T2,1. In order to achieve this temperature uniformity, the lower areas of the chambers C1 and E2 are designed as heat exchangers 14, The same holds true for chambers C2 and E3, which are also interconnected with a heat exchanger, so that the temperature T2,2 of the condenser C2 and temperature T3,1 of the evaporator E3 always keep the same temperatures.

Temperature and pressure measuring devices 26, 27 in each steam space 6 are used for process monitoring. In addition, a vacuum pump V at the end of each condensation path makes it possible to siphon away incondensable gases in the system. This is important for the process to run efficiently.

In prior art, the individual stages are only interconnected with heat exchangers, so that no exchange or flow of liquids or steam can arise between the various stages S. The stages are only connected with each other via heat exchangers. While the individual stages S do operate in different, respectively adjacent temperature ranges, each does so on its own.

In recent years, the systems were improved so as to raise the efficiencies and simplify the controllers. WO 2008/122136 describes an advantageous system according to prior art with a high efficiency. It is preferably used in the environment of heat-emitting systems, such as power plants, the released thermal energy of which can be used free of charge or inexpensively. In particular, this type of distillation system can also be given a multistage design, so as to utilize the entire provided differential temperature range, for example 50-100° C.

Available to make optimal use of the provided heat for the intended purpose are heat exchangers and other known auxiliaries, which are sufficiently known. In addition, electrical current is also required for operating such a distillation system, specifically among other things for conveying the liquids by means of pumps or operating vacuum pumps for siphoning incondensable gases. The power required for operating such systems makes up a significant portion of the overall operating costs. Therefore, the power requirement must be lowered to make the distillation system less expensive to operate.

BRIEF SUMMARY OF THE INVENTION

Therefore, the object of the present invention is to improve a multistage distillation system of the kind described at the outset in such a way as to lower power consumption during operation. Another object of the present invention is to describe a method that implements such a distillation, as well as controller for its operation.

The object is achieved by the features described hereinafter.

According to the invention, the distillation system described at the outset encompasses a pressure-tight steam line, which at a first end is connected with one of the pressure-tight liquid lines between two adjacent condensers or with the pressure-tight liquid line between the last and first evaporator. In addition, the second end of the pressure-tight steam line is connected with a steam space, which during operation has a higher pressure than the pressure in the pressure-tight liquid line for pressurizing the liquid with a higher pressure as well as for conveying the liquid.

This pressurization exposes the liquid in the liquid line to a higher pressure, which allows it to evaporate in a stage with a higher temperature. In addition, the pressurization can convey the liquid into a container arranged at a higher potential without having to use electrical current for this purpose. As a result, no pump whatsoever is required during continuous operation.

While pumps are still placed in the evaporator and condenser circuit, they are only necessary to start the process at the outset. The process already runs automatically within several minutes, without pumps having to be operated for circulating the liquids in the circuits. Only a vacuum pump for siphoning incondensable gases at the end of the condensation pathways in the condensers must every so often be made operational, but only for a short time.

Power consumption can be drastically lowered in the distillation system according to the invention. In addition, just a single pump is now required in each of the circuits, which also lowers the investment costs for the distillation system.

The method according to the invention for operating a distillation process with the use of a distillation system according to the invention has an inlet into the evaporator circuit, an outlet from the evaporator circuit, as well as a distillate outlet from the condenser circuit, and is characterized by the following procedural steps:

Monitoring the liquid quantities in both circuits; monitoring the concentration of residues in the evaporator circuit; letting out liquid with a high concentration of residues at the outlet as soon as the liquid in the evaporator circuit has reached a prescribed maximum level and/or the concentration of residues in the evaporator circuit has reached a prescribed maximum value; letting out distillate from the condenser circuit at the distillate outlet as soon as the liquid in the condenser circuit has reached a prescribed maximum level; letting liquid into the condenser circuit at the inlet as soon as the liquid in the evaporator circuit has reached a prescribed minimum level and/or the concentration of residues in the evaporator circuit has reached a prescribed maximum value. These steps are repeated until the process is to be stopped.

Liquid is preferably only let out from the evaporator circuit once both the maximum concentration and maximum level have been reached, and specifically until such time as the minimum level has been reached. By adding fresh liquid up to the maximum level, the concentration is then lowered. From that point on, the level is again raised to the respective maximum level as soon as the minimum level or maximum concentration has been reached.

A preferred method involves the use of a distillation system that comprises a vacuum pump, which is connected by a gas line with the end of each condensation path of each condenser. The method is characterized by the following procedural steps:

Determining the temperature differences in the steam spaces of the evaporators and condensers of the same stage; removing incondensable gases in the steam space of a condenser through the gas line by means of the vacuum pump as soon as the corresponding temperature difference has reached a prescribed maximum value until it has dropped below a prescribed minimum value. The mentioned steps are repeated until the process is to be stopped.

The controller according to the invention for implementing a method according to the invention encompasses ports for sensors to read in measuring data, a processor for evaluating the measuring data along with ports for changing the settings of valves and pumps.

BRIEF DESCRIPTION OF THE DRAWINGS

The invention will be described in greater detail below drawing reference to the figures. The same reference numbers each refer to the same facts. Because of the multi-stage character of the invention, alphanumeric reference characters are employed to associate similar components and thermodynamic states (alphas) within different individual stages (numerics). Shown on.

DESCRIPTION OF EXEMPLARY EMBODIMENTS OF THE INVENTION

Figure 1:
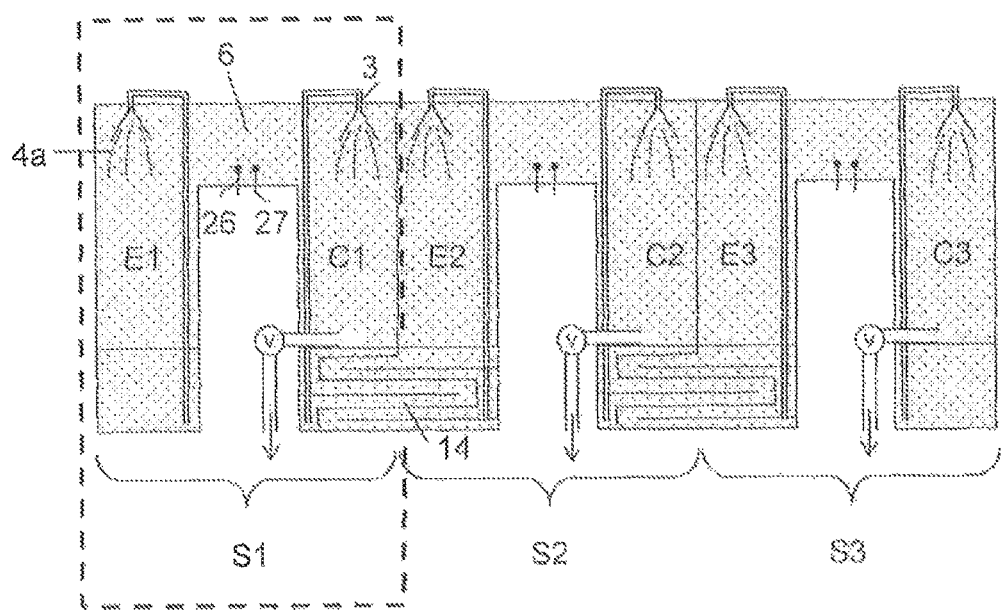
FIG. 1 is a multistage distillation system according to prior art.
Figure 2:
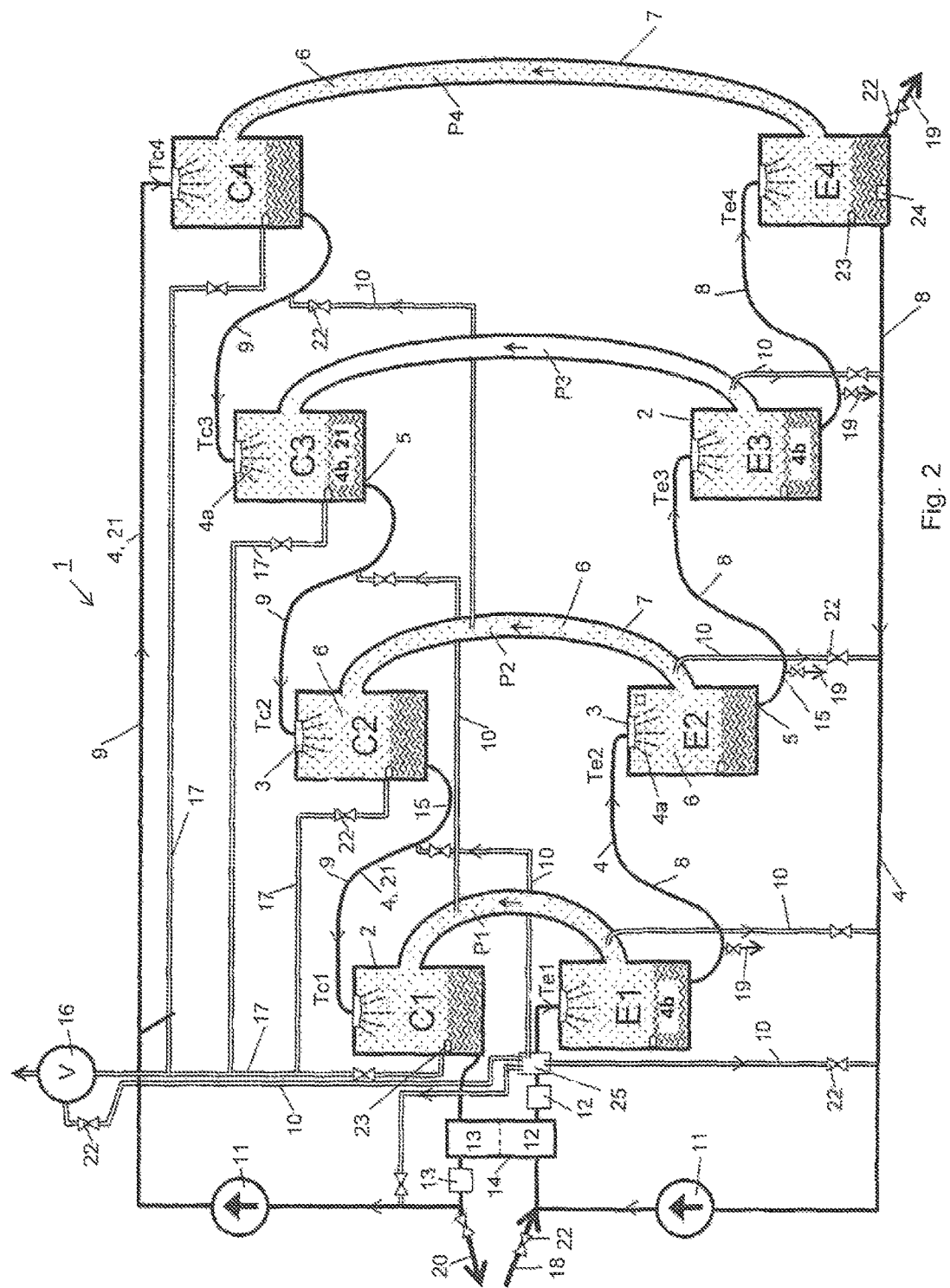
FIG. 2 is a multistage distillation system according to the invention.
Figure 3:
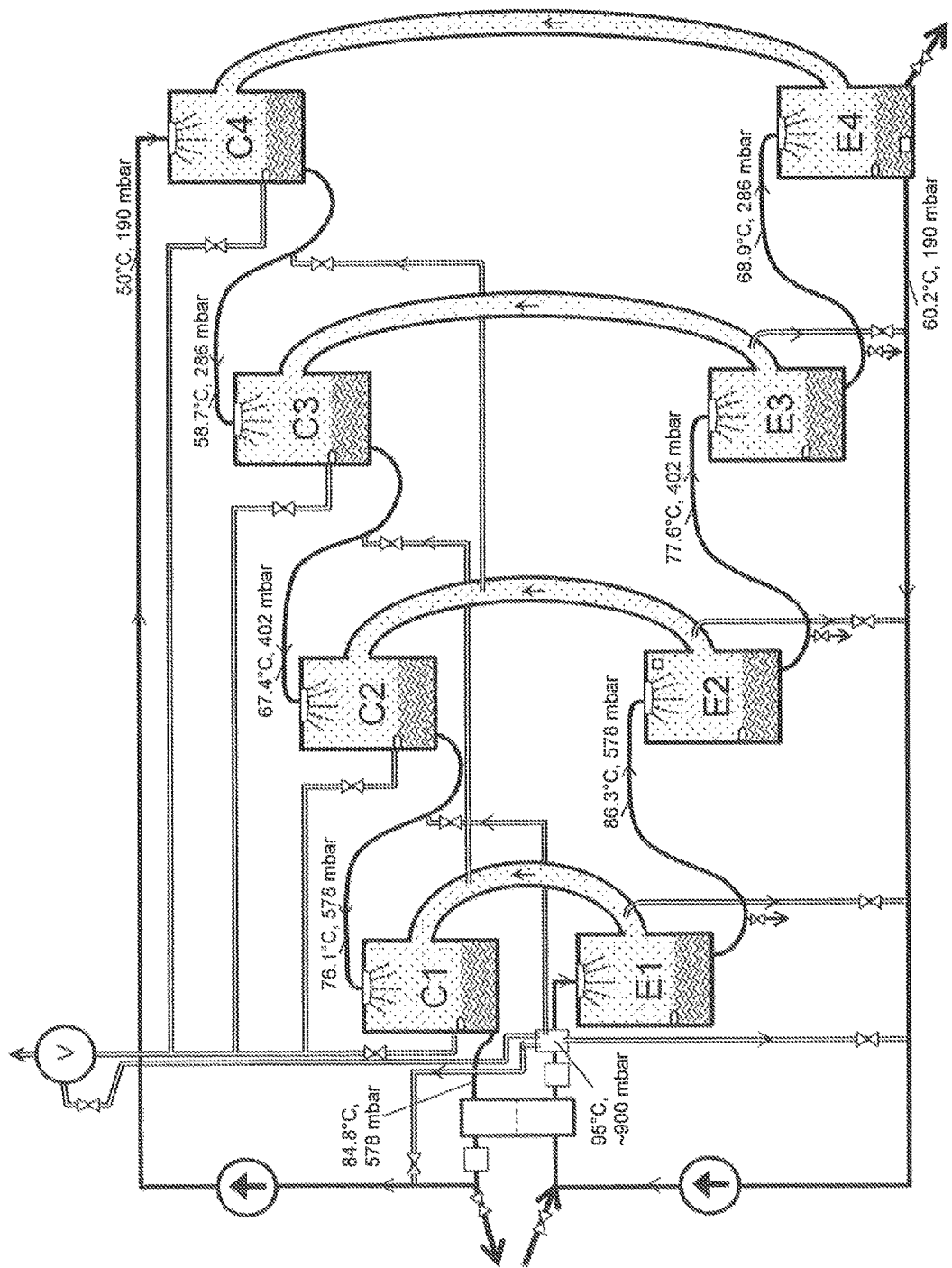
FIG. 3 is a distillation system according to FIG. 2 with exemplary temperature and pressure values.

FIG. 2 shows an exemplary embodiment according to the invention. The illustration depicts a multistage distillation system 1 with stages Si where i=1, ... n (n=4), wherein each stage Si works in a higher pressure and temperature range Pi, Ti than its ensuing stage Si+1 during operation. FIG. 3 presents a system according to FIG. 2, which indicates examples of pressure and temperature values for the individual containers and pressure chambers that might set in according to the invention.

Each stage Si encompasses an evaporator Ei and a condenser Ci, wherein each evaporator Ei and each condenser Ci is disposed within a pressure-tight container 2 or vessel Vi with each respective evaporator Ei and condenser Ci having its own upper spray inlet 3 for introducing and spraying added liquid 4a in the container 2, as well as with a lower outlet 5 for letting out liquid 4b captured in the container 2. In addition, each container 2 encompasses for each respective evaporator Ei and condenser Ci a steam space 6 between the spray inlet 3 and captured liquid 4b, wherein the steam space 6 of each evaporator Ei is connected in terms of pressure with the steam space 6 of the condenser Ci of the same stage Si by means of a pressure-tight steam pipe 7 having a large enough cross section that the pressure Pi in the two steam spaces 6 of a stage Si can always balance out during operation. The outlet 5 of each evaporator E1 is connected with the spray inlet 3 of the next evaporator Ei+1 and the outlet 5 of the last evaporator En is connected with the spray inlet 3 of the first evaporator E1 by way of a pressure-tight liquid line 8 to yield an evaporator circuit. Analogously thereto, the outlet 5 of each condenser Ci is connected with the spray inlet 3 of the preceding condenser Ci−1 and the outlet 5 of the first condenser C1 is connected with the spray inlet 3 of the last condenser Cn by means of a pressure-tight liquid line 9 to yield a condenser circuit.

According to the invention, the distillation system encompasses at least one pressure-tight steam line 10. Desirably, as shown in FIG. 2 for example, there is a plurality of pressure-tight steam lines 10. In one configuration, a first end of a pressure-tight steam line 10 is connected with one of the pressure-tight liquid lines 9 between the condensers Ci+1 and Ci[i−1 to 3], and a second end of the pressure-tight steam line 10 is connected to a steam space 6 having a higher pressure P during operation than the pressure Pi in the steam space 6 of the condenser Ci of the succeeding stage Si. Accordingly, as shown in FIG. 2, a first end of a pressure-tight steam line 10 is connected to the pressure-tight liquid line 9 that connects condenser C3 to condenser C2, and a second end of the pressure-tight steam line 10 is connected to the steam space 6 of the condenser C1 where the pressure P1 during operation is higher than the pressure P2 of the succeeding stage S2.

In another configuration, a first end of the pressure-tight steam line 10 is connected to the pressure-tight liquid line 8 between the evaporators En and E1, and a second end of the pressure-tight steam line 10 is connected with a steam space having a higher pressure P during operation than the pressure Pn in the steam space 6 of the evaporator En. Accordingly, as shown in FIG. 2 a first end of a pressure-tight steam line 10 is connected to the pressure-tight liquid line 8 that connects evaporator E4 and E1, and a second end of the pressure-tight steam line 10 is connected to the steam space having a higher pressure P3 during operation than the pressure Pn in the steam space of the evaporator En, so as to pressurize the liquid 4 with a higher pressure and convey the liquid 4. Alternatively, a second end of the pressure-tight steam line 10 is connected to a steam space having a higher pressure during operation than the pressure in the pressure-tight liquid line 8 to which the first end of the pressure-tight steam line 10 is connected.

In particular, the configuration of containers 2 can also be modified in such a way that the circuits of the evaporators and condensers are situated at the same level. For example, the condenser Cn and evaporator E1 would be at the same or similar level, just as the condenser C1 and evaporator En. This shortens the length of the connecting steam spaces 6. The indicated FIGS. 2 and 3 were depicted in this way for reasons of clarity, and must be understood as schematic illustrations.

According to the invention, the evaporators E and condensers C are spatially separated from each other in the distillation system 1 described here, and connected with each other by pipes having a cross section large enough that the pressure difference in the two chambers 2 of the same stage Si measures less than 10 mbar. It is important that this pressure compensation always be ensured. This spatial separation of the chambers 2 of the same stage Si now opens up options for interconnecting and spatially arranging chambers of the same kind, specifically the respective evaporators Ei and condensers Ci, in such a way that the liquids 4 flow into the next chamber 2 without the assistance of pumps as a result of the potential energy of the individual chambers 2 taking into account the respective steam pressures in the different stages Si. In particular, this takes place between the evaporators E1 to En, and between the condensers C1 and Cn. Consequently, energy support to drive the distillation system 1 is now only necessary in the liquid lines 9 between the condensers Cn to C1 as well as the liquid lines 8 between the evaporators En and E1.

This support can be provided either by mechanical pumps or steam pressure. When feeding steam into a liquid line at a pressure that exceeds the pressure in the target chamber, the liquid in the line is conveyed into the target chamber. To this end, steam can be taken from a steam space of the distillation chamber 1. However, if steam with suitable pressure and temperature conditions is available in another nearby source, it is naturally also possible to utilize the latter. In addition, as schematically shown in FIG. 2, a steam chamber 25 in which the liquid flowing through partially changes into steam can be set up in the liquid line before the evaporator E1. This steam is the hottest in the entire distillation system 1, and also has the highest pressure. The pressure in this steam chamber 25 is even higher than the pressure in the evaporator E1. Liquid 4 can be conveyed from this steam chamber 25 and pressurized, and must be brought to a slightly lower pressure. Examples may be gleaned from FIG. 2 and FIG. 3. The steam spaces 6 from stage S with lower pressures can convey via the steam lines 10 corresponding liquids, whose target containers 2 are under a lower pressure than the steam spaces 6 from which the steam lines 10 derive their pressure.

As schematically shown in FIG. 2, the distillation system 1 preferably has one pump 11 each in the liquid line 8 of the evaporator circuit and in the liquid line 9 of the condenser circuit to reach the prescribed pressures of the liquids 4 at the start of the process. However, the latter need only run for a few minutes until the ideal pressure and temperature conditions have been established in all containers 2. The process then runs independently. The pumps 11 are preferably arranged in the connecting elements 8, 9 between the containers C1 and Cn or between the containers En and E1.

In addition, the distillation system 1 preferably has a heater 12 in the liquid line 8 of the evaporator circuit before the evaporator E1 and a cooling aggregate 13 in the liquid line of the condenser circuit before the condenser Cn for achieving the prescribed temperatures in the evaporator E1 and condenser Cn. This heater 12 and this cooling aggregate 13 are preferably at least partially together configured as a heat exchanger 14. However, since the heat exchanger 14 cannot reach the desired target temperatures of the ensuing containers Cn or E1, the lines 8, 9 must also incorporate a respective separate cooling aggregate 13 in the liquid line 9 of the condenser circuit along with a separate heater 12 in the liquid line 8 of the evaporator circuit.

As has been shown, it is advantageous for initiating the process that enough liquid 4 still be present in the individual sections of the liquid lines 8, 9. In order to ensure the above, as schematically shown in FIG. 2, siphons 15 can be arranged in the liquid lines 9, 8 between the condensers Cn to C1 and/or between the evaporators E1 to En, so as to prevent individual condensers Ci and/or evaporators Ei from idling given a system shutdown.

In another preferred arrangement, the siphons 15 in the liquid lines 8 between the evaporators E1 and En have a central spout. It has been shown that increased residues accumulate there, which in this way can be easily removed from the circuit in high concentrations.

In order for the process to run optimally and to evaporate as much of the introduced liquid as possible, incondensable gases that accumulate at the end of the condensation path must from time to time be removed from the steam spaces 6. To this end, as schematically shown in FIG. 2, each condenser Ci has a gas line 17 connected with a vacuum pump 16 at the end of the distillation path. If needed, the vacuum pump 16 is made operational, although this is also only required for a brief time, as a rule for less than 5% of the operating time.

As has been shown, the vacuum pump 16 can also be operated with steam. It must be connected with a pressure-tight steam line 10 as schematically shown in FIG. 2, in order to be supplied during operation. The vacuum pump 16 is thereby supplied with steam, which has a higher pressure P than the steam spaces 6 in which gases are to be siphoned.

As a result, absolutely no electric power is required to be used during operation once the process has started and reached a stable state.

In addition, the individual containers 2 are preferably aligned level to each other in such a way as to enable optimal use of the potential energy of the liquid. According to the invention, each evaporator $E_{i+1}$ is arranged on a lower level than the preceding evaporator $E_i$ in such a way that the liquid 4 is made to flow from each evaporator $E_i$ into the respectively ensuing evaporator $E_{i+1}$ solely by pressure and level differences during implementation of the process, without an electrically operated pump being required for this purpose, Since each ensuing stage $S_{i+1}$ operates at a lower pressure than its preceding stage $S1$, the ensuing stage $S_{i+1}$ can be arranged correspondingly higher, so that liquid flows upward due to its elevated pressure.

Accordingly, each condenser $C_{i+1}$ is arranged at such a level by comparison to its ensuing condenser $C_i$ that the liquid is made to flow from the condenser $C_{i+1}$ into the respective ensuing condenser $C_i$ by pressure and level differences and/or the conveying force of a steam line during process implementation, without an electrically operated pump being required for this purpose. Since the direction of flow in the condenser circuit is opposite the direction of flow in the evaporator, the liquid flows from containers 2 with lower pressures to containers 2 with higher pressures. This can be partially supported by arranging the condensers of the higher stages higher than the condensers of the lower stages. For support purposes, the liquid is additionally supplied by feeding steam to steam lines 10 under a higher pressure. This eliminates the need for using pumps that use electric current.

In addition, the condensers C1 and Cn are leveled in such a way that the liquid 4 of the condenser C1 is made to flow from the condenser C1 to the condenser Cn via the liquid line 9 of the condenser circuit by pressure and level differences during process implementation, without an electrically operated pump being required for this purpose. Since the pressure in C1 is much higher than in Cn, a great height can be overcome without a pump being required for this purpose.

The evaporators En and E1 are preferably also leveled in such a way that the liquid 4 of the evaporator En is made to flow from the evaporator En to the evaporator E1 by pressure and level differences and by the conveying force of one or more steam lines 10 via the liquid line 8 of the evaporator circuit during process implementation, without an electrically operated pump being required for this purpose. This section of the liquid line 8 requires both that height be overcome and pressure be applied. This is preferably achieved incrementally by introducing several steam lines 10 from varying stages S into the liquid line 8. The different steam lines 10 can also be introduced into the liquid line 8 at the same location or be operated one after the other, so that the respectively best suited steam line 10 is always operational.

The steam lines 10 can optionally also be routed inside of the respective liquid line 8, 9.

The distillation system 1 according to the invention encompasses a feed 18 into the evaporator circuit for supplying liquid 4 to be distilled, along with an outlet 19 from the evaporator circuit for letting out liquid 4 with a high concentration of residues, as well as a distillate outlet 20 from the condenser circuit for letting out the distillate 21 generated by the system. These are shown schematically on FIG. 2.

In addition, each steam line 10 and/or each gas line 17 encompasses a valve 22 for regulating the flow rate. These valves 22 are preferably controllable and connected with a regulating device.

At least the containers 2 of the first condenser C1 and last evaporator En each encompass a level sensor 23 for determining the levels of the liquid 4b captured in the containers 2. The other containers 2 can also have such level sensors 23. However, in particular the two mentioned level sensors 23 are required for regulating the process. In addition, the preferred distillation system 1 has a sensor 24 in the evaporation circuit, preferably in the area of the last evaporator En as schematically shown in FIG. 2, for measuring the concentration of residues. The respective sensors 23, 24 are also preferably controllable and connected with a regulating device (not shown).

Described below is the method according to the invention for operating a distillation process using a distillation system 1 according to the invention, which comprises a feed 18 in the evaporator circuit for supplying liquid 4 to be distilled, along with an outlet 19 from the evaporator circuit for letting out liquid 4 with a high concentration of residues, as well as a distillate outlet 20 from the condenser circuit for letting out the distillate 21 generated by the distillation system. According to the invention, the following procedural steps are implemented in this method:

Monitoring the liquid level in the evaporator circuit and in the condenser circuit; monitoring the concentration of residues in the evaporator circuit; letting out liquid with a high concentration of residues at the outlet 19 as soon as the liquid level in the evaporator circuit has reached a prescribed maximum level and/or the concentration of residues in the evaporator circuit has reached a prescribed maximum value; letting out distillate from the condenser circuit at the distillate outlet 20 as soon as the liquid level in the condenser circuit has reached a prescribed maximum level; letting liquid 4 into the condenser circuit at the feed 18 as soon as the liquid level in the evaporator circuit has reached a prescribed minimum value and/or the concentration of residues in the evaporator circuit has reached a prescribed maximum value. The aforementioned steps are repeated until the process is to be stopped.

Remarkable in the above method is the fact that the pressure and temperatures in the individual chambers regulate themselves as soon as the boundary conditions are present. Only the supply and removal of liquid or distillate is regulated. In addition, care must be taken at the beginning of the process that the liquids flowing into the evaporator E1 and condenser Cn correspond to the prescribed pressure and temperature conditions. This is achieved by the heater 12 and cooling aggregate 13.

In order to improve the process, incondensable gases should be removed from the condenser circuit. To this end, each condenser Ci has a gas line 17 connected with a vacuum pump 16 at the end of the distillation path. The method is enhanced by the following procedural steps:

Determining the temperature differences $\Delta T_i$ in the steam spaces 6 of the containers 2 of evaporators Ei and condensers Ci of the same stage Si; removing incondensable gases in the steam space 6 of the condenser Ci through the gas line 17 using the vacuum pump 16 as soon as the temperature difference $\Delta T i$ has reached a prescribed maximum value, until $\Delta T i$ has reached a prescribed minimum value; repeating these steps until the process is to be stopped.

A controller according to the invention for implementing a method according to the invention encompasses ports for sensors to read in measuring data, a processor for evaluating the measuring data, along with ports for changing the settings of valves 22 and pumps 11, 16.

As a rule, the valves 22 are open. However, it may be that several valves 22 are closed or throttled at the beginning of the process.

REFERENCE LIST

1 Distillation system
2 Container or vessel
3 Spray inlet
4 Liquid; 4a sprayed liquid; 4b captured liquid
5 Outlet
6 Steam space
7 Steam pipe
8 Liquid line to an evaporation circuit
9 Liquid line to a condenser circuit
10 Steam line
11 Pump
12 Heater
13 Cooling aggregate
14 Heat exchanger
15 Siphons
16 Vacuum pump
17 Gas line
18 Feed
19 Letting out liquid with a high concentration of residues
20 Distillate outlet
21 Distillate
22 Valve
23 Level sensor
24 sensor for measuring the concentration of residues
25 Steam chamber
26 Temperature sensor
27 Pressure sensor
E Evaporator, E1, . . . En
C Condenser, C1, . . . Cn
S Stage, S1, . . . Sn

The invention claimed is:

1. A multistage distillation system, comprising:
a plurality of stages Si, where i=1, . . . n, wherein each stage Si works in a higher pressure and temperature range ($\Delta P i, \Delta T i$) than its ensuing stage Si+1 during operation, wherein each stage Si includes a pressure-tight vessel Vi that contains an evaporator Ei and a condenser Ci, wherein each evaporator Ei includes a spray inlet for introducing and spraying added liquid into the evaporator Ei and a lower outlet for letting out liquid from the evaporator Ei and defines a steam space between the spray inlet and the lower outlet, wherein each condenser Ci includes a spray inlet for introducing and spraying added liquid into condenser Ci and a lower outlet for letting out liquid from the condenser Ci and defines a steam space between the spray inlet and the lower outlet;
a pressure-tight steam pipe disposed within each vessel Vi and connecting the steam space of each evaporator Ei with the steam space of each condenser Ci;
an evaporator circuit configured with the outlet of each evaporator Ei connected via a respective pressure-tight liquid line with the spray inlet of the next evaporator Ei+1 except that the outlet of the last evaporator En is connected by a respective pressure-tight liquid line with the spray inlet of the first evaporator E1;
a condenser circuit configured with the outlet of each condenser Ci connected via a respective pressure-tight liquid line with the spray inlet of the preceding condenser Ci−1 (i≠1) except that the outlet of the first condenser C1 is connected with the spray inlet of the last condenser Cn; and
a pressure-tight steam line having a first end connected with one of the pressure-tight liquid lines between the condenser Ci and the condenser Ci−1 (i≠1) or with the pressure-tight liquid line between the evaporators En and E1, and the pressure-tight steam line having a second end connected with a steam space having a higher pressure P during operation than the pressure in the pressure-tight liquid line to which the first end of the pressure-tight steam line is connected, so as to pressurize a liquid therein with a higher pressure and convey the liquid.

2. The multistage distillation system according to claim 1, further comprising a first pump connected to one of the liquid lines of the evaporator circuit, and a second pump connected to the liquid line of the condenser circuit.

3. The multistage distillation system according to claim 1, further comprising a heater connected to the liquid line of the evaporator circuit before the first evaporator E1 and a cooling aggregate connected to the liquid line of the condenser circuit before the last condenser Cn.

4. The multistage distillation system according to claim 3, wherein the heater and the cooling aggregate are together at least partially configured as a heat exchanger.

5. The multistage distillation system according to claim 1, further comprising a plurality of siphons, a respective siphon being arranged in each of the respective liquid lines between the condensers Cn to C1.

6. The multistage distillation system according to claim 1, wherein each condenser Ci has a gas line connected with a vacuum pump.

7. The multistage distillation system according to claim 6, wherein the vacuum pump is connected with a second pressure-tight steam line, which supplies the vacuum pump during operation by feeding steam to the vacuum pump having a higher pressure P than a steam space defined by a condenser Ci from which gases are to be siphoned.

8. The multistage distillation system according to claim 1, wherein each evaporator Ei+1 is arranged on a lower level than the preceding evaporator Ei in such a way that the liquid is made to flow from each evaporator Ei into the respectively ensuing evaporator Ei+1 solely by pressure and level differences, without an electrically operated pump being required for this purpose.

9. The multistage distillation system according to claim 1, wherein each condenser Ci+1 is arranged at such a level by comparison to its ensuing condenser Ci that the liquid is made to flow from the condenser Ci+1 into the respective ensuing condenser Ci by pressure and level differences and/or the conveying force of an additional steam line during process implementation, without an electrically operated pump being required for this purpose.

10. The multistage distillation system according to claim 1, wherein the condensers C1 and Cn are leveled in such a way that the liquid of the condenser C1 is made to flow from the condenser C1 to the condenser Cn via the liquid line of the condenser circuit by pressure and level differences without an electrically operated pump being required for this purpose.

11. The multistage distillation system according to claim 1, wherein the evaporators En and E1 are leveled in such a way that the liquid of the evaporator En is made to flow from the evaporator En to the evaporator E1 by pressure and level differences and by the conveying force of a steam line via the liquid line of the evaporator circuit, without an electrically operated pump being required for this purpose.

12. The multistage distillation system according to claim 1, further comprising:
   a feed in the evaporator circuit for supplying liquid to be distilled,
   an outlet from the evaporator circuit for letting out liquid with residues, and
   a distillate outlet from the condenser circuit.

13. The multistage distillation system according to claim 1, wherein each pressure-tight steam line encompasses a valve for regulating a flow rate therein.

14. The multistage distillation system according to claim 1, wherein at least the vessels of the first condenser C1 and the last evaporator En each encompass a level sensor for determining the level of liquid captured in the respective vessel.

15. The multistage distillation system according to claim 1, wherein a sensor is arranged in the evaporator circuit for measuring residue concentrations therein.

16. The distillation system according to claim 1, further comprising a plurality of siphons, a respective siphon being arranged in each of the respective liquid lines between each of the respective evaporators E1 to En.

17. A method for implementing a distillation process using a multistage distillation system according to claim 12, comprising the following procedural steps:

a. monitoring for the attainment of a liquid level in the evaporator circuit as measured by a level sensor in evaporator En and in the condenser circuit;
   b. monitoring for the attainment of a concentration of residues in the evaporator circuit as measured by a sensor in evaporator En;
   c. letting out liquid at the outlet from the evaporator circuit upon the attainment of at least one of the following two conditions: (1) as soon as the liquid level in the evaporator circuit has reached a prescribed maximum level and (2) the concentration of residues in the evaporator circuit has reached a prescribed maximum value;
   d. letting out distillate from the evaporator circuit at the distillate outlet as soon as the liquid level in the condenser circuit has reached a prescribed maximum level; and
   e. letting liquid into the condenser circuit at the feed as soon as the liquid level in the evaporator circuit has reached a prescribed minimum value and/or the concentration of residues in the evaporator circuit has reached a prescribed maximum value.

18. The method according to claim 17, wherein each condenser Ci has a gas line connected with a vacuum pump, further comprising the following procedural steps:
   f. determining a temperature difference between the steam spaces of the evaporators Ei and condensers Ci of the same stage Si;
   g. as soon as the temperature difference has reached a prescribed maximum value, then removing incondensable gases in the steam space of the condenser Ci through the gas line using the vacuum pump until the temperature difference between the steam spaces of the evaporators Ei and condensers Ci of the same stage Si has reached a prescribed minimum value.

* * * * *